US005902387A

United States Patent [19]

Suzuki et al.

[11] Patent Number: 5,902,387

[45] **Date of Patent: *May 11, 1999**

[54] INK-JET TEXTILE PRINTING INK, AND INK-JET PRINTING PROCESS AND INSTRUMENT MAKING USE OF THE SAME

[75] Inventors: Mariko Suzuki, Kawasaki; Masahiro Haruta, Tokyo; Shoji Koike, Yokohama; Koromo Shirota, Tokyo; Tomoya Yamamoto, Kawasaki, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/596,892

[22] Filed: Mar. 18, 1996

Related U.S. Application Data

[63] Continuation of application No. 08/214,486, Mar. 18, 1994, abandoned.

[30] Foreign Application Priority Data

Mar. 23, 1993 [JP] Japan .................................... 5-063974

[51] Int. Cl.[6] .................................................... C09D 11/02

[52] U.S. Cl. ....................................... 106/22 R; 106/20 D

[58] Field of Search ............................... 106/22 R, 20 D, 106/31.27, 31.58

[56] References Cited

U.S. PATENT DOCUMENTS

| | | | |
|---|---|---|---|
| 4,410,899 | 10/1983 | Haruta et al. | 346/140 R |
| 4,647,285 | 3/1987 | Scheibli et al. | 8/528 |
| 5,100,496 | 3/1992 | Pontes et al. | 106/20 D |
| 5,443,630 | 8/1995 | von der Eltz et al. | 106/22 R |

FOREIGN PATENT DOCUMENTS

| | | |
|---|---|---|
| 0177449A1 | 4/1986 | European Pat. Off. . |
| 54-059936 | 5/1979 | Japan . |
| 56-143272 | 11/1981 | Japan . |
| 61-231289 | 10/1986 | Japan . |
| 62-283174 | 12/1987 | Japan . |
| 63-168382 | 7/1988 | Japan . |
| 2233780 | 9/1990 | Japan . |
| 03046589 | 7/1991 | Japan . |
| 4339876 | 11/1992 | Japan . |

OTHER PUBLICATIONS

English Translation of Japanese Patent Application Laid–Open No. 4–339876, Nov. 26, 1992, pp. 1–28.

English Translation of Japanese Patent Application Laid–Open No. 2–233780, Sep. 17, 1990, pp. 1–19.

*Primary Examiner*—Helene Klemanski
*Attorney, Agent, or Firm*—Fitzpatrick, Cella, Harper & Scinto

[57] ABSTRACT

Disclosed herein is an ink-jet textile printing ink comprising a reactive dye and an aqueous liquid medium, wherein the ink contains at least one substance selected from the group consisting of dicarboxylic acids and alkali metal salts thereof.

12 Claims, 3 Drawing Sheets

INK-JET TEXTILE PRINTING INK, AND INK-JET PRINTING PROCESS AND INSTRUMENT MAKING USE OF THE SAME

This application is a continuation of application Ser. No. 08/214,486 filed Mar. 18, 1994, now abandoned.

BACKGROUND OF THE INVENTION

1. Field of the Invention

The present invention relates to an ink-jet textile printing ink suitable for use in conducting textile printing, in particular, on woven or nonwoven fabrics of cotton, silk or the like, which are dyeable with reactive dyes and composed principally of cellulose fibers and/or polyamide fibers, or mixed woven or nonwoven fabrics composed of these fibers and other fibers, and an ink-jet printing process and an instrument making use of the ink.

2. Related Background Art

At present, textile printing is principally conducted by screen printing or roller printing. Both methods are unfit for multi-kind small-quantity production and difficult to quickly cope with the fashion of the day. Therefore, there has recently been a demand for development of an electronic printing system making no use of any plate.

In compliance with this demand, many textile printing processes according to ink-jet recording have been proposed. Various fields expect much from such textile printing processes.

Ink-jet textile printing inks are required to have the following performance characteristics:

(1) being able to develop the color of ink to a sufficient color depth;

(2) causing no clogging in an ejection orifice;

(3) being able to quickly dry on cloth;

(4) undergoing little irregular feathering on cloth;

(5) undergoing no changes in physical properties and ejection properties and depositing no solid matter in the course of storage; and (6) undergoing no change in ejection properties even in a long-time ejection durability test, and causing neither disconnection nor deposition of foreign matter on a heating head, in particular, in a case of textile printing by a system making use of thermal energy.

In order to satisfy these performance characteristics required, the following means have heretofore been proposed.

First, in order to cope with the requirement (1), it has been generally conducted to make the concentration of a dye high, to obtain the sufficient color depth. This method is an essential means for using ink droplets as minute as 200 pl or less, or conducting textile printing on a cloth high in absorbing power. However, such an ink finally causes the problem as to the requirement (2) because of thickening of the ink and deposition of the dye as solid matter due to evaporation of water in the ink from the tip of a nozzle.

It has therefore been conducted to add a polyhydric alcohol such as glycerol to an ink in order to cope with the requirement (2). However, this means is not useful if the concentration of a dye contained in the ink exceeds 5%, and hence does not give a satisfactory result except for the case of an extremely specific combination of dye and solvent.

No particular problem is offered to the requirement (3), which is greatly affected by the water repellency of a cloth to be used, so far as a water-based ink is used for a cloth composed mainly of cellulose fibers and/or polyamide fibers.

In order to cope with the requirement (4), many proposals such as addition of, for example, tannin (Japanese Patent Application Laid-Open No. 61-231289) or a carboxyl group-containing polymer (Japanese Patent Application Laid-Open No. 62-283174) to an ink have been made. However, both proposals can not avoid the problems of the requirements (1) and (2) arising from ink.

With respect to the requirements (5) and (6), close investigations have not been conducted under the circumstances because an improvement may be made on the basis of the structure of dye or by additives.

In the field of textile printing, there has been a demand for dyeing cloths of different kinds. However, the optimum composition of an ink varies with individual cloths. More specifically, a dye to be use greatly varies in kind and even fixing conditions thereof depending upon the dyeing mechanism between dye and cloth, which is an ionic bonding, a covalent bonding or a simple diffusion of the dye into fibers. In addition, since polyester and cellulose fibers considerably differ from each other in affinity for water, the design of the whole liquid medium including additives must be devised if printing is conducted with a water-based ink on cloths formed of such fibers.

Accordingly, technical problems required of inks vary little by little depending upon cloths to be printed, so that individual designs are required for inks.

As described above, means capable of satisfying one of the above requirements have been able to be found in the prior art. However, there have not yet been known any textile printing ink and ink-jet printing process, which can satisfy all the above-mentioned requirements at the same time and solve a series of the above problems.

SUMMARY OF THE INVENTION

It is therefore an object of the present invention to provide an ink which can solve, at the same time, the problems of the textile printing inks and ink-jet printing processes heretofore in common use, i.e., a problem of dyeing that ink should provide prints bright and high in color depth on a cloth comprising principally cellulose fibers and/or polyamide fibers, and problems of ejection performance that ink should have good short-term and long-term stability, its dyeing properties should remain unchanged during storage at room temperature and ink should permit textile printing with high reliability even when the ink is ejected by using thermal energy, and to provide a printing process and an instrument making use of such an ink.

Such an object can be achieved by the present invention described below.

According to the present invention, there is thus provided an ink-jet textile printing ink comprising a reactive dye and an aqueous liquid medium, wherein the ink contains at least one substance selected from the group consisting of dicarboxylic acids and alkali metal salts thereof.

According to the present invention, there is also provided an ink-jet textile printing ink comprising a reactive dye and an aqueous liquid medium, wherein the ink contains at least one substance selected from the group consisting of tricarboxylic acids and alkali metal salts thereof.

According to the present invention, there are further provided an ink-jet printing process comprising applying an ink to a cloth in accordance with an ink-jet system, subjecting the cloth to a reactively fixing treatment and then washing the cloth thus treated to remove an unreacted dye, wherein the ink comprises a reactive dye and an aqueous liquid medium and contains at least one substance selected from the group consisting of dicarboxylic acids and alkali metal salts thereof and the cloth comprises cellulose fibers and/or polyamide fibers, and instruments suitable for use in such a process.

According to the present invention, there are still further provided an ink-jet printing process comprising applying an ink to a cloth in accordance with an ink-jet system, subjecting the cloth to a reactively fixing treatment and then washing the cloth thus treated to remove an unreacted dye, wherein the ink comprises a reactive dye and an aqueous liquid medium and contains at least one substance selected from the group consisting of tricarboxylic acids and alkali metal salts thereof and the cloth comprises cellulose fibers and/or polyamide fibers, and instruments suitable for use in such a process.

DETAILED DESCRIPTION OF THE PREFERRED EMBODIMENTS

Figure 1:
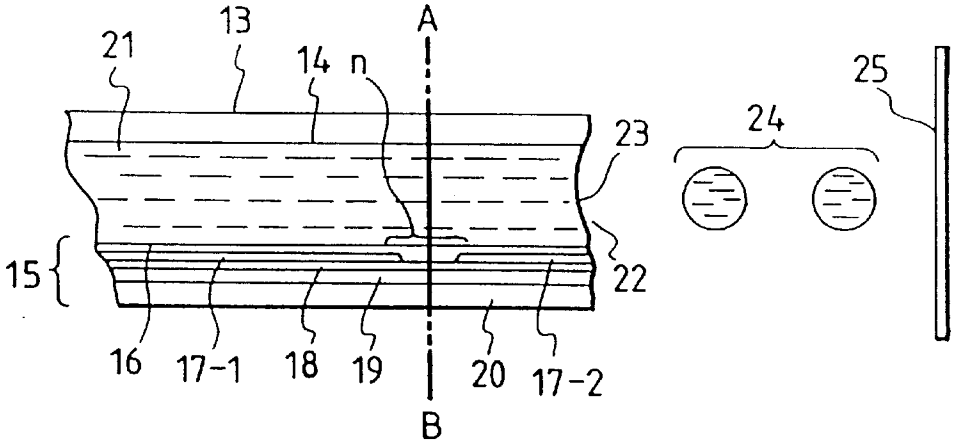
FIG. 1 is a longitudinal cross-sectional view of a nozzle of an ink-jet recording apparatus.

The present inventors have carried out improvement in inks with a view toward allowing them to satisfy all the above performance requirements at the same time. As a result, it has been found that when a dicarboxylic acid and/or an alkali metal salt thereof, or a tricarboxylic acid and/or an alkali metal salt thereof is contained in an ink making use of a reactive dye, the dyeing properties of the ink, such as level dyeing ability, color yield, coloring ability and saturation, for cloths comprising cellulose fibers and/or polyamide fibers can be improved to a marked extent, its ejection properties remain stable over a long period of time, and the ink can be ejected stably for a long period of time and undergoes no changes in ejection properties and coloring properties even after being stored for a long period of time.

These effects were particularly remarkable in the case where an ink-jet head making good use of thermal energy was used.

The reason why the coloring properties have been improved is believed to be as follows. The interaction between dye molecules is inhibited in an aqueous liquid medium owing to the presence of the dicarboxylic acid and/or the alkali metal salt thereof, or the tricarboxylic acid and/or the alkali metal salt thereof, so that the reactivity on a molecular level of the dye to the fibers is enhanced by leaps and bounds.

The good long-term stabilization of the ejection properties and coloring properties is believed to be attributable to a buffer effect owing to the carboxylic acids used in the present invention and the anti-aggregating effect of the dye.

In the case where a head making good use of thermal energy is used, it has been confirmed that the inks according to the present invention inhibit the accumulation of deposits on a heater of the head.

An ink containing excess of the carboxylic acid and/or the salt thereof causes reduction in bubbling force due to deposits on a head and deposition of the carboxylic acid and/or the salt thereof at the tip of a nozzle. However, it has been also confirmed that when a deposit is formed by adding such a compound in an adequate amount, cavitation upon the vanishing of bubbles is lightened without causing reduction of bubbling force, and so disconnection is prevented.

The ink-jet textile printing inks according to the present invention are principally characterized in that they comprise a reactive dye and an aqueous liquid medium and contain at least one of dicarboxylic acids and alkali metal salt thereof, or of tricarboxylic acids and alkali metal salt thereof.

No particular limitation is imposed on the form of the dicarboxylic acid. However, preferable examples thereof include malonic acid, succinic acid, maleic acid and itaconic acid, with malonic acid and succinic acid being more preferred. No particular limitation is imposed on the form of the tricarboxylic acid. However, a preferable example thereof includes citric acid.

Preferable examples of the alkali metal in the case where the carboxylic acid is used as a salt include Li, Na and K.

The total content of these compounds in the ink is within a range of from 0.01 to 10% by weight, preferably from 0.02 to 5% by weight, more preferably from 0.03 to 3% by weight based on the total weight of the ink. The problem of clogging generally can be prevented in the field of textile printing so long as the content falls within this range.

If the carboxylic acid and its alkali metal salt are contained in combination, it is preferable to mix them in advance before their addition to the ink.

Besides, the mixing ratio of the acid to the salt in these compounds can be controlled to adjust the ink to a specific pH. The pH of the ink is within a range of from 4 to 9, preferably from 4.5 to 8.5, more preferably from 5 to 8. If the total content of these substances in the ink is lower than 0.01% by weight, the ejection properties of the ink may be deteriorated in some cases, to say nothing of the fact that the effect to improve coloring ability is insufficient. In addition, when an ink-jet head making good use of thermal energy is used, heater failure may occur in drive of the order of $1 \times 10^8$ pulses.

If the total content of these substances in the ink exceeds 10% by weight on the contrary, clogging due to the deposition of the carboxylic acids and the salts thereof may occur near the tip of a nozzle according to the composition of ink in addition to the problem of coloring ability even when the diameter of the nozzle is considerably great. In addition, when the head making good use of thermal energy is used, the accumulation of deposits occurs on a heater of the head, resulting in ejection failure due to reduction in bubbling force.

No particular limitation is imposed on the reactive dye useful in the practice of the present invention. However, dyes having a vinylsulfone group and/or a monochlorotriazine group are preferred. The reason why the preferred reactive groups are specified is that the two reactive groups described above are excellent in strength of reactivity from the viewpoint of balance taking into consideration a system intended for the present invention. For example, a dichlorotriazine group high in reactivity is hard to achieve the effects of the present invention, while a trichloropyridine group low in reactivity can not achieve the effects of the present invention.

Specific examples of such dyes include C.I. Reactive Yellow 2, 15, 37, 42, 76 and 95, C.I. Reactive Red 21, 22, 24, 31, 33, 45, 58, 111, 112, 114, 180, 218 and 226, C.I. Reactive Blue 15, 19, 21, 38, 49; 72, 77, 176, 203 and 220, C.I. Reactive Orange 5, 12, 13 and 35, C.I. Reactive Brown 7, 11, 33 and 46, C.I. Reactive Green 8 and 19, C.I. Reactive Violet 2, 6 and 22, C.I. Reactive Black 5, 8, 31 and 39, and the like, to which, however, are not limited. These dyes may be contained in an ink either singly or in any combination with dyes of the same or different hues. The total amount of the dyes to be used is generally within a range of from 2 to 30% by weight, preferably from 3 to 25% by weight, more preferably from 5 to 20% by weight based on the total weight of the ink. Amounts less than 2% by weight result in an ink insufficient in color depth. On the other hand, amounts exceeding 30% by weight result in an ink insufficient in ejection properties.

Water, which is an essential component of the liquid medium for the inks according to the present invention, is used within a range of from 30 to 95% by weight, preferably from 40 to 90% by weight, more preferably from 50 to 85% by weight based on the total weight of the ink.

The above components are essential components for the inks according to the present invention. However, general organic solvents may also be used in combination with water as other components of the liquid medium for the inks. Examples thereof include ketones and keto-alcohols such as acetone and diacetone alcohol; ethers such as tetrahydrofuran and dioxane; oxyethylene or oxypropylene addition polymers such as diethylene glycol, triethylene glycol, tetraethylene glycol, dipropylene glycol, tripropylene glycol, polyethylene glycol and polypropylene glycol; alkylene glycols the alkylene moiety of which has 2 to 6 carbon atoms, such as ethylene glycol, propylene glycol, trimethylene glycol, butylene glycol and hexylene glycol; triols such as 1,2,6-hexanetriol; thiodiglycol; glycerol; lower alkyl ethers of polyhydric alcohols, such as ethylene glycol monomethyl (or monoethyl) ether, diethylene glycol monomethyl (or monoethyl) ether and triethylene glycol monomethyl (or monoethyl) ether; lower dialkyl ethers of polyhydric alcohols, such as triethylene glycol dimethyl (or diethyl) ether and tetraethylene glycol dimethyl (or diethyl) ether; sulfolane; N-methyl-2-pyrrolidone; 1,3-dimethyl-2-imidazolidinone; and the like.

The content of the water-soluble organic solvent as described above is generally within a range of from 3 to 60% by weight, preferably from 5 to 50% by weight based on the total weight of the ink.

The liquid medium components as described above may be used either singly or in any combination thereof if used in combination with water. However, preferable compositions of the liquid media are those comprising thiodiglycol, a polymer of oxyethylene or oxypropylene which has a polymerization degree of 2 to 4, and a mono- or dialkyl ether of the polymer. Among others, a single solvent of thiodiglycol or a mixed solvent system of diethylene glycol and thiodiglycol is particularly preferred.

The principal components of the inks according to the present invention are as described above. However, as other ingredients of the aqueous liquid medium, may be added various kinds of dispersants, surfactants, viscosity modifiers, surface tension modifiers, optical whitening agents and the like as needed.

Specific examples thereof include viscosity modifiers such as polyvinyl alcohol and water-soluble resins; various kinds of anionic or nonionic surfactants; surface tension modifiers such as diethanolamine and triethanolamine; pH adjustors including alkali metals; mildewproofing agents; and the like.

The inks according to the present invention may preferably be used on cloths comprising principally cellulose fibers and/or polyamide fibers at least containing an alkaline substance. No particular limitation is imposed on the production process for such cloths. However, the cloths described in Japanese Patent Application Laid-Open No. 63-168382, Japanese Patent Publication No. 3-46589, etc. may be used.

Viewed from physical features of fibers and yarn making up a cloth, those long in fiber length, thin in thickness of the yarn and fibers and many in number of them are suitable for the inks of the present invention.

For example, a cloth formed from fibers having an average length of 25 to 60 mm, an average thickness of 0.6 to 2.2 deniers and an average number of twist of 70/cm to 150/cm is preferred in the case of cloth composed mainly of cellulose fibers, and a cloth formed from silk yarn, which is one kind of polyamide fibers, having an average thickness of 14 to 147 deniers composed of fibers having an average thickness of 2.5 to 3.5 deniers in the case of cloth composed mainly of silk fibers.

Any pretreatment routinely used may be subjected on the cloths used in the present invention as needed. In particular, cloths containing 0.01 to 5% by weight of at least one alkaline substance or 0.01 to 20% by weight of at least one substance selected from the group consisting of water-soluble metal salts, water-soluble polymers, urea and thiourea may preferably be used in some cases.

Examples of the alkaline substance used in the present invention include alkali metal hydroxides such as sodium hydroxide and potassium hydroxide, amines such as mono-, di- and triethanolamines, alkali metal carbonates and bicarbonates such as sodium carbonate, potassium carbonate and sodium bicarbonate, etc. Metal salts of organic acids such as calcium acetate and barium acetate, ammonia and ammonium compounds may also be included. Further, sodium trichloroacetate and the like, which form an alkaline substance by steaming or under dry heat, may also be used. Sodium carbonate and sodium bicarbonate, which are used in dyeing regarding reactive dyes, are particularly preferred alkaline substances.

Examples of the water-soluble polymers include natural water-soluble polymers such as, for example, starches from corn, wheat and the like, cellulosics such as carboxymethyl cellulose, methyl cellulose and hydroxyethyl cellulose, polysaccharides such as sodium alginate, gum arabic, locust bean gum, tragacanth gum, guar gum and tamarind seed, proteins such as gelatin and casein, tannin and derivatives thereof, and lignin and derivatives thereof.

Examples of synthetic polymers include polyvinyl alcohol type compounds, polyethylene oxide type compounds, water-soluble acrylic polymers, water-soluble maleic anhydride polymers and the like. Of these, the polysaccharide polymers and cellulosic polymers are preferred.

Examples of the water-soluble metal salts include compounds such as halides of alkali metals and alkaline earth metals, which form typical ionic crystals and have a pH of 4 to 10. Representative examples of such compounds include NaCl, $Na_2SO_4$, KCl and $CH_3COONa$ for alkali metals, and $CaCl_2$ and $MgCl_2$ for alkaline earth metals. Of these, salts of Na, K and Ca are preferred.

Further, the water content of the cloth also greatly affects textile printing. The water content of the cloth may preferably be adjusted to a 5 to 100 percent raise, more preferably a 6 to 80 percent raise of the official moisture regain (cellulose fiber: 8.5%, silk fiber: 12%).

A process in which a cloth is immersed in purified water or an aqueous solution of one of the pretreating agents described above and then squeezed by rollers, and optionally dried is generally used as a method of adjusting the water content, to which, however, is not limited.

The water content is determined in accordance with the following equation:

$$\text{Water content } (\%) = \{(W-W')/W''\} \times 100$$

wherein W is a weight of a sample before drying, W' is a weight of the sample after drying, and W" is a weight of the sample after water washing and drying.

The ink-jet printing processes according to the present invention are processes making use of the above-described inks according to the present invention. As the ink-jet recording system used in these processes, may be used any conventionally-known ink-jet recording system. However, the method described in, for example, Japanese Patent Application Laid-Open No. 54-59936, i.e., a system in which thermal energy is applied to an ink so as to undergo rapid volume change, and the ink is ejected from an orifice by action force caused by this change of state is the most effective method. The use of the inks according to the present invention in such a system permits stable textile printing without causing deposition of foreign matter on a heating head and disconnection even if printing is conducted continuously for a long time.

As an illustrative example of an apparatus, which is suitable for use in conducting textile printing using the inks according to the present invention, may be mentioned an apparatus in which thermal energy corresponding to recording signals is applied to an ink within a recording head, and ink droplets are generated in accordance with the thermal energy.

Figure 2:
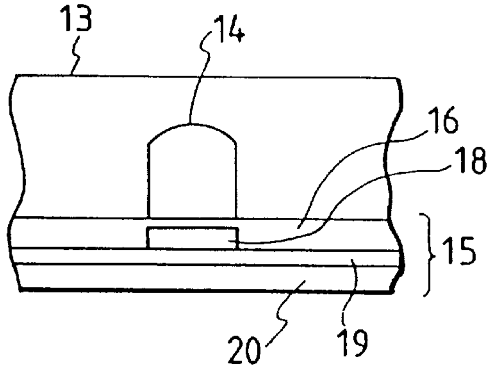
FIG. 2 is a transverse cross-sectional view of the nozzle of the ink-jet recording apparatus.
Figure 3:
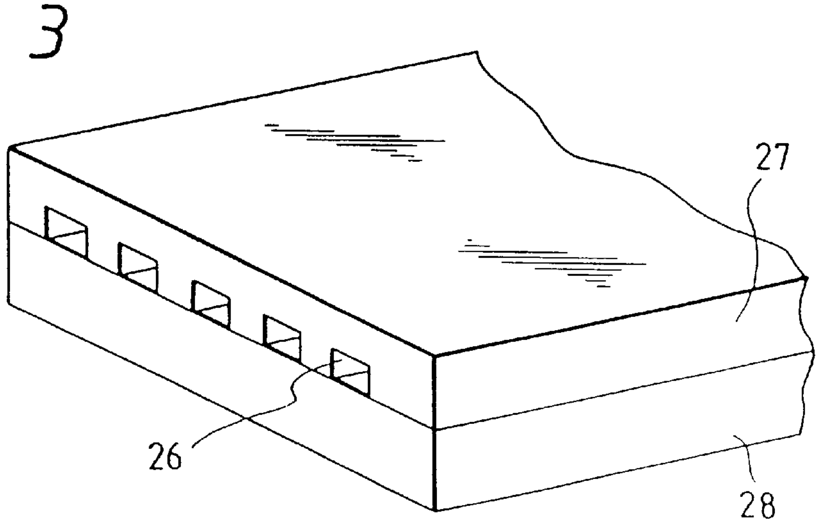
FIG. 3 is a perspective view of the appearance of a multi-head which is an array of such nozzles heads as shown in FIG. 1.

Examples of the construction of a head, which is a main component of such an apparatus, are illustrated in FIGS. 1, 2 and 3.

A nozzle 13 is formed by bonding a glass, ceramic or plastic plate or the like having a groove 14 through which ink is passed, to a heating plate 15 used in thermal recording (the drawing shows a head, to which, however, is not limited). The heating plate 15 is composed of a protective film 16 formed of silicon oxide or the like, aluminum electrodes 17-1 and 17-2, a heating resistor layer 18 formed of nichrome or the like, a heat accumulating layer 19, and a substrate 20 made of alumina or the like having a good heat radiating property.

An ink 21 flows to an ejection orifice 22 (a minute opening) and forms a meniscus 23 owing to a pressure P.

Now, upon application of electric signals to the electrodes 17-1, 17-2, the heating plate 15 rapidly generates heat at the region shown by n to form bubbles in the ink 21 which is in contact with this region. The meniscus 23 of the ink is projected by the action of the pressure thus produced, and the ink 21 is ejected from the orifice 22 to a cloth 25 comprising cellulose fibers and/or polyamide fibers in the form of recording droplets 24. FIG. 3 illustrates an appearance of a multi-head composed of an array of a number of nozzles as shown in FIG. 1. The multi-head is formed by closely bonding a glass plate 27 having a number of grooves 26 to a heating plate 28 similar to the plate as illustrated in FIG. 1. Incidentally, FIG. 1 is a cross-sectional view of the head 13 taken along the flow path of the ink, and FIG. 2 is a cross-sectional view taken along line A–B in FIG. 1.

Figure 4:
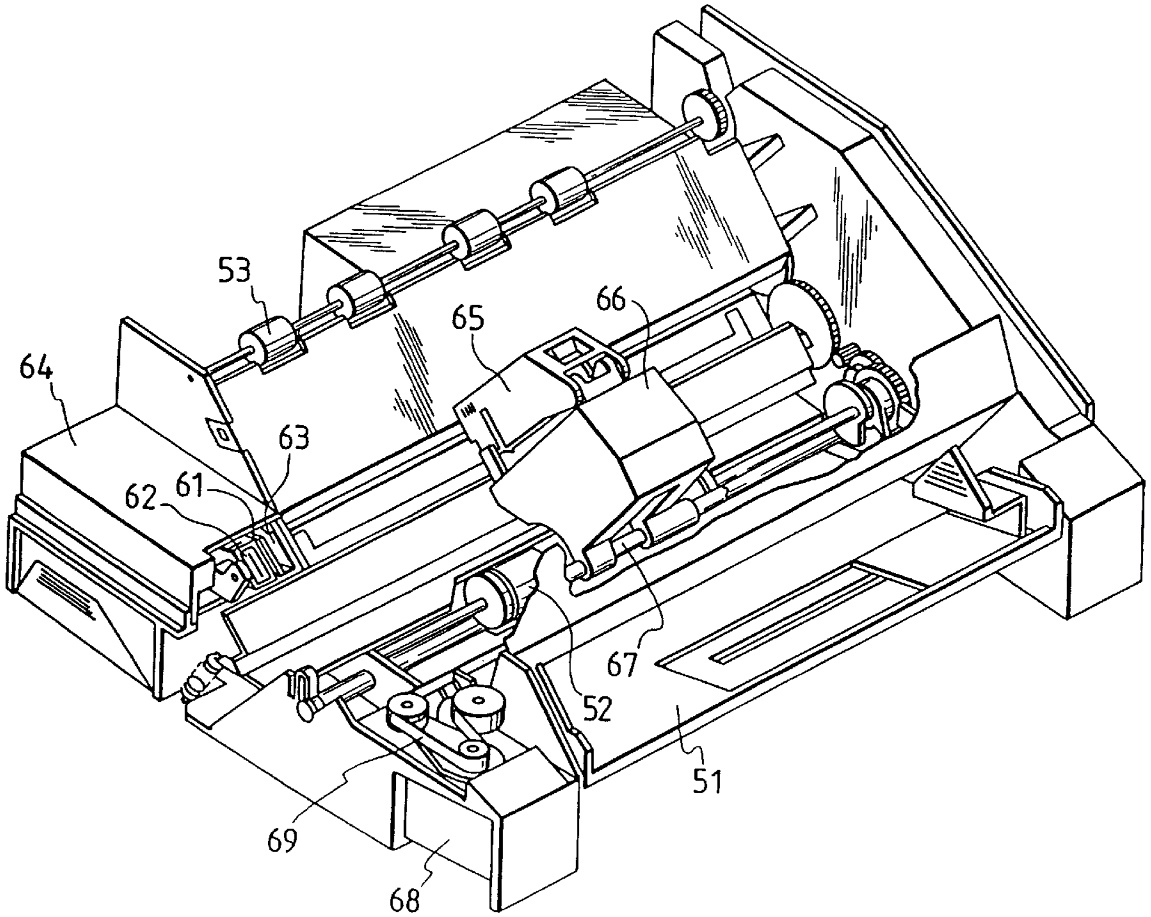
FIG. 4 is a perspective view of an illustrative ink-jet recording apparatus.

FIG. 4 illustrates an example of an ink-jet recording apparatus in which such a head has been incorporated.

In FIG. 4, reference numeral 61 designates a blade serving as a wiping member, one end of which is a stationary end held by a blade-holding member to form a cantilever. The blade 61 is provided at the position adjacent to the region in which a recording head operates, and in this embodiment, is held in such a form that it protrudes to the course through which the recording head is moved. Reference numeral 62 indicates a cap, which is provided at the home position adjacent to the blade 61, and is so constituted that it moves in the direction perpendicular to the direction in which the recording head is moved and comes into contact with the face of ejection openings to cap it. Reference numeral 63 denotes an absorbing member provided adjoiningly to the blade 61 and, similar to the blade 61, held in such a form that it protrudes to the course through which the recording head is moved. The above-described blade 61, cap 62 and absorbing member 63 constitute a recovery portion 64 for the recording head, where the blade 61 and absorbing member 63 remove off water, dust and/or the like from the face of the ink-ejecting openings.

Reference numeral 65 designates the recording head having an ejection-energy-generating means and serving to eject the ink onto the cloth set in an opposing relation with the ejection opening face provided with ejection openings to conduct recording. Reference numeral 66 indicates a carriage on which the recording head 65 is mounted so that the recording head 65 can be moved. The carriage 66 is slidably interlocked with a guide rod 67 and is connected (not illustrated) to a belt 69 driven by a motor 68. Thus, the carriage 66 can be moved along the guide rod 67 and hence, the recording head 65 can be moved from a recording region to a region adjacent thereto.

Reference numerals 51 and 52 denote a cloth feeding part from which the cloths are separately inserted, and cloth feed rollers driven by a motor (not illustrated), respectively. With such construction, the cloth is fed to the position opposite to the ejection opening face of the recording head, and discharged from a cloth discharge section provided with cloth discharge rollers 53 with the progress of recording.

In the above constitution, the cap 62 in the head recovery portion 64 is receded from the moving course of the recording head 65 when the recording head 65 is returned to its home position, for example, after completion of recording, and the blade 61 remains protruded to the moving course. As a result, the ejection opening face of the recording head 65 is wiped. When the cap 62 comes into contact with the ejection opening face of the recording head 65 to cap it, the cap 62 is moved so as to protrude to the moving course of the recording head.

When the recording head 65 is moved from its home position to the position at which recording is started, the cap 62 and the blade 61 are at the same positions as the positions upon the wiping as described above. As a result, the ejection opening face of the recording head 65 is also wiped at the time of this movement.

The above movement of the recording head to its home position is made not only when the recording is completed or the recording head is recovered for ejection, but also when the recording head is moved between recording regions for the purpose of recording, during which it is moved to the home position adjacent to each recording region at given intervals, where the ejection opening face is wiped in accordance with this movement.

Figure 5:
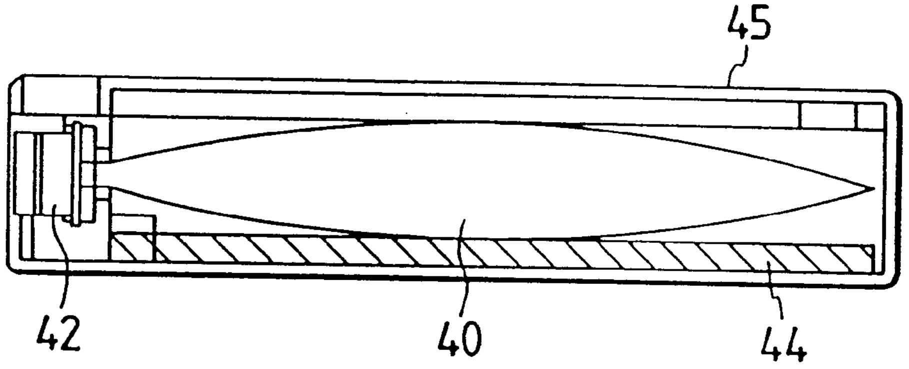
FIG. 5 is a longitudinal cross-sectional view of an ink cartridge.

FIG. 5 illustrates an exemplary ink cartridge in which an ink to be fed to the head through an ink-feeding member, for example, a tube is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink-absorbing member for receiving waste ink. In this invention, it is preferable that the ink container portion be formed of a polyolefin, in particular, polyethylene, at its surface with which the ink comes into contact. A device in which these members are integrally formed may also be preferably used.

Figure 6:
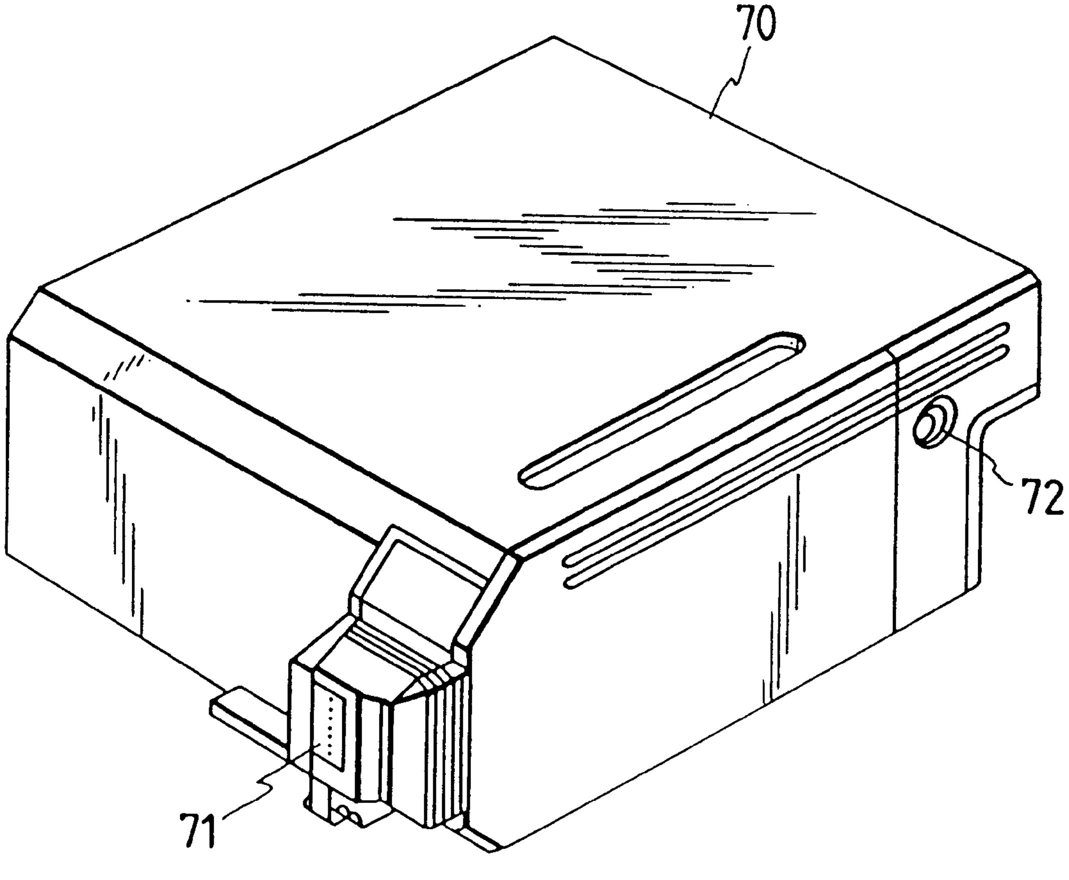
FIG. 6 is a perspective view of a recording unit.

In FIG. 6, reference numeral 70 designates a recording unit, in the interior of which an ink container portion containing an ink, for example, an ink-absorbing member, is contained. The recording unit 70 is so constructed that the ink in such an ink-absorbing member is ejected in the form of ink droplets through a head 71 having a plurality of orifices. In the present invention, polyurethane is preferably used as a material for the ink-absorbing member. Reference numeral 72 indicates an air passage for communicating the interior of the recording unit with the atmosphere This recording unit 70 can be used in place of the recording head shown in FIG. 4, and is detachably installed on the carriage 66.

As conditions under which textile printing particularly high in effect can be carried out with the inks according to the present invention, it is preferred that an ejected ink droplet be within a range of from 20 to 200 pl, a shot-in ink quantity be within a range of from 4 to 40 $nl/mm^2$, a drive frequency be at least 1.5 kHz, and a head temperature be within a range of from 35 to 60° C.

The printing textile ink according to the present invention is applied onto a cloth in the above-described manner. However, the ink only adheres to the cloth in this state. Accordingly, the cloth must be subsequently subjected to a process for reactively fixing the dye in the ink to the fibers and a process for removing an unreacted dye. Such reactive fixing and removal of the unreacted dye may be conducted in accordance with any conventionally known methods. For example, the recorded cloth is treated by a steaming process, an HT steaming process or a thermofix process, or in the case where no alkali-treated cloth is used, an alkaline pad-steam process, an alkaline blotch-steam process, an alkaline shock process or an alkaline cold fix process. In particular, the steaming process and the HT steaming process are preferred because the effects of the present invention can be more enhanced. Subsequent washing may be conducted in accordance with a method known per se in the art.

The cloth subjected to the above-described treatments is then cut into desired sizes as needed, and the cut pieces are subjected to processes required to obtain final processed articles, such as sewing, bonding and/or welding, thereby obtaining apparel such as one-piece dresses, other dresses, neckties or bathing suits, bed covers, sofa covers, handkerchieves, curtains, or the like. Methods in which a cloth is processed by sewing and/or the like to obtain apparel or other daily needs are described in many known books, for example, "Saishin Nitto Hosei Manual (The Newest Knitting and Sewing Manual)", published by Seni Journal Co.; a monthly magazine, "Soen", published by Bunka Shuppan Kyoku; etc.

EXAMPLES

The present invention will hereinafter be described more specifically by the following Examples and Comparative Examples. Incidentally, all designations of "part" or "parts" and "%" as will be used in the following examples mean part or parts by weight and % by weight unless expressly noted.

EXAMPLE 1

| | |
|---|---|
| Reactive dye (C.I. Reactive Yellow 95) | 10parts |
| Thiodiglycol | 24parts |
| Diethylene glycol | 11parts |
| Water | 54.5parts |

After all the above components were mixed and stirred for 1 hour, the mixture was adjusted to pH 7 with NaOH, to which the following components were added to stir the mixture for 2 hours. The mixture was then filtered through a "Fluoropore Filter FP-100" (trade name; product of Sumitomo Electric Industries, Ltd.), thereby obtaining an ink-jet textile printing ink (A) (pH 6.2) according to the present invention.

| | |
|---|---|
| Citric acid | 0.05part |
| Trisodium citrate | 0.45part |

EXAMPLE 2

| | |
|---|---|
| Reactive dye (C.I. Reactive Red 226) | 10parts |
| Thiodiglycol | 15parts |
| Diethylene glycol | 10parts |
| Tetraethylene glycol dimethyl ether | 5parts |
| Water | 60parts |

After all the above components were mixed and stirred for 1 hour, the mixture was adjusted to pH 7 with NaOH, to which the following components were added to stir the mixture for 2 hours. The mixture was then filtered through a "Fluoropore Filter FP-100" (trade name; product of Sumitomo Electric Industries, Ltd.), thereby obtaining an ink-jet textile printing ink (A) (pH 6.7) according to the present invention.

| | |
|---|---|
| Citric acid | 0.001part |
| Trisodium citrate | 0.009part |

EXAMPLE 3

| | |
|---|---|
| Reactive dye (C.I. Reactive Blue 15) | 13parts |
| Thiodiglycol | 23parts |
| Triethylene glycol monobutyl ether | 6parts |
| Water | 58parts |

After all the above components were mixed and stirred for 1 hour, the mixture was adjusted to pH 7 with NaOH, to which the following components were added to stir the mixture for 2 hours. The mixture was then filtered through a "Fluoropore Filter FP-100" (trade name; product of Sumitomo Electric Industries, Ltd.), thereby obtaining an ink-jet textile printing ink (C) (pH 6.0) according to the present invention.

| | |
|---|---|
| Citric acid | 1part |
| Trisodium citrate | 9parts |

EXAMPLE 4

| | |
|---|---|
| Reactive dye (C.I. Reactive Brown 11) | 2parts |
| Reactive dye (C.I. Reactive Orange 12) | 1.5parts |
| Reactive dye (C.I. Reactive Black 39) | 6.5parts |
| Thiodiglycol | 23parts |
| Diethylene glycol | 5parts |
| Dipropylene glycol | 3parts |
| Water | 58.5parts |

After all the above components were mixed and stirred for 1 hour, the mixture was adjusted to pH 7 with NaOH, to which the following components were added to stir the mixture for 2 hours. The mixture was then filtered through a "Fluoropore Filter FP-100" (trade name; product of Sumitomo Electric Industries, Ltd.), thereby obtaining an ink-jet textile printing ink (D) (pH 6.1) according to the present invention.

| | |
|---|---|
| Succinic acid | 0.025part |
| Disodium succinate | 0.475part |

EXAMPLE 5

| | |
|---|---|
| Reactive dye (C.I. Reactive Blue 49) | 15parts |
| Thiodiglycol | 16parts |
| Diethylene glycol | 17parts |
| Water | 51.5parts |

After all the above components were mixed and stirred for 1 hour, the mixture was adjusted to pH 7 with NaOH, to which the following components were added to stir the mixture for 2 hours. The mixture was then filtered through a "Fluoropore Filter FP-100" (trade name; product of Sumitomo Electric Industries, Ltd.), thereby obtaining an ink-jet textile printing ink (E) (pH 6.2) according to the present invention.

| | |
|---|---|
| Citric acid | 0.05part |
| Disodium malonate | 0.45part |

EXAMPLE 6

| | |
|---|---|
| Reactive dye (C.I. Reactive Red 218) | 15parts |
| Thiodiglycol | 16parts |
| Diethylene glycol | 12parts |
| Tripropylene glycol | 5parts |
| Water | 51.5parts |

After all the above components were mixed and stirred for 1 hour, the mixture was adjusted to pH 7 with NaOH, to which the following components were added to stir the mixture for 2 hours. The mixture was then filtered through a "Fluoropore Filter FP-100" (trade name; product of Sumitomo Electric Industries, Ltd.), thereby obtaining an ink-jet textile printing ink (F) (pH 6.1) according to the present invention.

| | |
|---|---|
| Malonic acid | 0.05part |
| Disodium succinate | 0.45part |

EXAMPLE 7

| | |
|---|---|
| Reactive dye (C.I. Reactive Yellow 2) | 15parts |
| Thiodiglycol | 16parts |
| Diethylene glycol | 17parts |
| Water | 51.5parts |

After all the above components were mixed and stirred for 1 hour, the mixture was adjusted to pH 7 with NaOH, to which the following component was added to stir the mixture for 2 hours. The mixture was then filtered through a "Fluoropore Filter FP-100" (trade name; product of Sumitomo Electric Industries, Ltd.), thereby obtaining an ink-jet textile printing ink (G) (pH 6.8) according to the present invention.

| | |
|---|---|
| Trisodium citrate | 0.5part |

COMPARATIVE EXAMPLE 1

| | |
|---|---|
| Reactive dye (C.I. Reactive Yellow 95) | 10parts |
| Thiodiglycol | 24parts |
| Diethylene glycol | 11parts |
| Water | 55parts |

After all the above components were mixed and stirred for 3 hours, the mixture was adjusted to pH 7 with NaOH and then filtered through a "Fluoropore Filter FP100" (trade name; product of Sumitomo Electric Industries, Ltd.), thereby obtaining a comparative ink-jet textile printing ink (H).

COMPARATIVE EXAMPLE 2

| | |
|---|---|
| Reactive dye (C.I. Reactive Yellow 95) | 10parts |
| Thiodiglycol | 24parts |
| Diethylene glycol | 11parts |
| Water | 54.5parts |

After all the above components were mixed and stirred for 1 hour, the mixture was adjusted to pH 7 with NaOH, to which the following components were added to stir the mixture for 2 hours. The mixture was then filtered through a "Fluoropore Filter FP-100" (trade name; product of Sumitomo Electric Industries, Ltd.), thereby obtaining a comparative ink-jet textile printing ink (I) (pH 6.5).

| | |
|---|---|
| Formic acid | 0.01part |
| Sodium formate | 0.45part |

APPLICATION EXAMPLE

Using the respective ink-jet textile printing inks (A through I) obtained in Examples 1 to 7 and Comparative Examples 1 and 2, continuous printing of $2\times10^8$ pulses by 10 nozzles was conducted by means of a head (number of nozzles. 256, ejected ink droplet: 20 to 40 pl) of a "Color Bubble Jet Copier PIXEL PRO" (trade name, manufactured by Canon Inc.) making good use of thermal energy to investigate whether clogging of nozzles, reduction in amount of ejected ink and ejection speed, and the like occurred or not.

Further, after English characters and numerals were continuously printed for 3 minutes using the same head as that used above, and the printing was then stopped, the head was left to stand for 7 days without capping the nozzles to investigate the presence of clogging of the nozzles due to deposition of solid matter near the tip of each nozzle (each nozzle was heated to a temperature range of from 35 to 60° C. prior to its use).

Further, each of the ink-jet textile printing inks (A through I) in an amount of 100 cc was put into a glass bottle to store it for 20 days at 50° C., thereby investigating its storage stability The properties and evaluation results of the inks are shown in Table 1.

Furthermore, each of the ink-jet textile printing inks (A through I) obtained in Examples 1 to 7 and Comparative Examples 1 and 2 was charged in a "Color Bubble Jet Copier PIXEL PRO" (trade name, manufactured by Canon Inc.) to conduct printing on a 100% cotton sheet (plain weave fabric, 100% of Egyptian cotton, water content: 15%) pretreated with an alkali and a 100% silk sheet (with 8 monme of habutae, water content: 18%). The print samples thus obtained were fixed by a steaming treatment at 104° C. for 10 minutes. Thereafter, these print samples were washed with a neutral detergent to evaluate the inks in level dyeing ability. The results are shown in Table 2 (each of the print samples was provided as a solid printed sample of 2×10 cm under conditions of a shot-in ink quantity of 16 nl/mm$^2$).

Incidentally, all the print samples obtained by using the comparative ink-jet textile printing inks were poor in color yield, coloring ability and saturation compared with those obtained by using the ink-jet textile printing inks of Examples.

TABLE 1

| | Example | | | | | | | Comp. Ex. | |
|---|---|---|---|---|---|---|---|---|---|
| | 1 | 2 | 3 | 4 | 5 | 6 | 7 | 1 | 2 |
| Ink | (A) | (B) | (C) | (D) | (E) | (F) | (G) | (H) | (I) |
| Ejection*1 stability | A | A | A | A | A | A | A | A | C |
| Deposition*2 on the tip of nozzle | A | A | A | A | A | A | A | B | B |
| Storage*3 stability | A | A | A | A | A | A | A | C | C |

TABLE 2

| Level dyeing*4 ability | Example | | | | | | | Comp. Ex. | |
|---|---|---|---|---|---|---|---|---|---|
| | 1 | 2 | 3 | 4 | 5 | 6 | 7 | 1 | 2 |
| Ink | (A) | (B) | (C) | (D) | (E) | (F) | (G) | (H) | (I) |
| All cotton | A | A | A | A | A | A | A | B | B |
| All silk | A | A | A | A | A | A | A | B | B |

*4: Each print sample was observed by naked eyes to evaluate the ink by the degree of unevenness, thereby ranking it in accordance with the following standard:
A: The print sample was even;
B: Unevenness was partly observed;
C: Unevenness was entirely observed.

According to the inks of the present invention, as described above, prints free of feathering, bright and high in color depth can be provided using cloths composed mainly of cellulose fibers and/or polyamide fibers.

Besides, the inks according to the present invention are good in short-term and long-term stability, and their dyeing properties remain unchanged during storage at room temperature.

According to the inks of the present invention, further, ink-jet printing can be conducted with high reliability of ejection performance without causing clogging of head nozzles and the like over a long period of time. In particular, the effects of the present invention are brought about markedly in recording of a type that an ink is ejected by the bubbling phenomenon of ink caused by thermal energy.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded to the broadest interpretation so as to encompass all such modifications and equivalent structures and functions.

What is claimed is:

1. An ink-jet textile printing ink comprising a reactive dye and an aqueous liquid medium, wherein the ink contains at least one substance selected from the group consisting of dicarboxylic acids and alkali metal salts thereof, and wherein the ink has a pH of from 4 to 9.

2. An ink-jet textile printing ink comprising a reactive dye and an aqueous liquid medium, wherein the ink contains at least one substance selected from the group consisting of tricarboxylic acids and alkali metal salts thereof, and wherein the ink has a pH of from 4 to 9.

3. The ink-jet textile printing ink according to claim 1 or 2, wherein the total content of said at least one substance selected from the group consisting of the dicarboxylic acids and alkali metal salts thereof, or the tricarboxylic acids and alkali metal salts thereof is within a range of from 0.01 to 10% by weight based on the total weight of the ink.

4. The ink-jet textile printing ink according to claim 1, wherein the dicarboxylic acid and/or the alkali metal salt thereof is at least one substance selected from the group consisting of malonic acid, succinic acid and alkali metal salts thereof.

5. The ink-jet textile printing ink according to claim 2, wherein the tricarboxylic acid and/or the alkali metal salt thereof is at least one substance selected from the group consisting of citric acid and alkali metal salts thereof.

6. The ink-jet textile printing ink according to claim 1 or 2, wherein the reactive dye is a reactive dye having a vinylsulfone group and/or a monochlorotriazine group.

7. An ink-jet textile printing ink for printing on a textile including cellulose fibers and/or polyamide fibers comprising a reactive dye and an aqueous liquid medium, wherein the ink contains at least one substance selected from the group consisting of dicarboxylic acids and alkali metal salts thereof, and wherein the ink has a pH of from 4 to 9.

8. An ink-jet textile printing ink for printing on a textile including cellulose fibers and/or polyamide fibers comprising a reactive dye and an aqueous liquid medium, wherein the ink contains at least one substance selected from the group consisting of tricarboxylic acids and alkali metal salts thereof, and wherein the ink has a pH of from 4 to 9.

9. The ink-jet textile printing ink according to claim 7 or 8, wherein the total content of said at least one substance selected from the group consisting of the dicarboxylic acids and alkali metal salts thereof, or the tricarboxylic acids and alkali metal salts thereof is within a range of from 0.01 to 10% by weight based on the total weight of the ink.

10. The ink-jet textile printing ink according to claim 7, wherein the dicarboxylic acid and/or the alkali metal salt thereof is at least one substance selected from the group consisting of malonic acid, succinic acid and alkali metal salts thereof.

11. The ink-jet textile printing ink according to claim 8, wherein the tricarboxylic acid and/or the alkali metal salt thereof is at least one substance selected from the group consisting of citric acid and alkali metal salts thereof.

12. The ink-jet textile printing ink according to claim 7 or 8, wherein the reactive dye is a reactive dye having a vinylsulfone group and/or a monochlorotriazine group.

* * * * *

UNITED STATES PATENT AND TRADEMARK OFFICE

CERTIFICATE OF CORRECTION

PATENT NO. : 5,902,387

DATED : May 11, 1999

INVENTOR(S) : MARIKO SUZUKI, ET AL.

It is certified that error appears in the above-identified patent and that said Letters Patent is hereby corrected as shown below:

COLUMN 3:

Line 25, "heads" should be deleted.

COLUMN 13:

Line 1, "nozzles." should read --nozzles:--.
Line 18, "stability The" should read --stability. The--.
Line 50, Insert after TABLE 1: --

*1: Continuous printing of 2 x $10^8$ pulses was conducted by 10 nozzles to determine number of nozzles which did not cause clogging, reduction in amount of ejected ink and ejection speed, etc., whereby each ink was ranked in accordance with the following standard:

A: 10 nozzles;
B: 6 to 9 nozzles;
C: 5 nozzles or less.

*2: After conducting continuous printing for 3 minutes, the head was left to stand for 7 days without capping the nozzles to observe the state of clogging of the nozzles due to deposition of solid matter near the tip of each nozzle, whereby each ink was ranked in accordance with the following standard:

UNITED STATES PATENT AND TRADEMARK OFFICE
CERTIFICATE OF CORRECTION

PATENT NO. : 5,902,387

DATED : May 11, 1999

INVENTOR(S) : MARIKO SUZUKI, ET AL.

It is certified that error appears in the above-identified patent and that said Letters Patent is hereby corrected as shown below:

COLUMN 13: continued

A: No clogging occurred;
B: Clogging occurred, but was recovered by suction;
C: Clogging was not recovered by suction.

*3: After storing each ink in a glass bottle for 20 days at 50°C, whether foreign matter generated in the glass bottle or not was observed by naked eyes to evaluate the ink. Further, printing was conducted at a shot-in ink quality of 16 $nl/mm^2$ using the stored ink to develop color, thereby comparing its color depth with that of a print sample obtained by using the ink before the storage to rank the ink in accordance with the following standard:

A: No foreign matter generated. There was no difference in color depth between the inks before and after the storage;
B: Foreign matter generated a little. Color depth slightly reduced;

UNITED STATES PATENT AND TRADEMARK OFFICE

CERTIFICATE OF CORRECTION

PATENT NO. : 5,902,387

DATED : May 11, 1999

INVENTOR(S) : MARIKO SUZUKI, ET AL.

It is certified that error appears in the above-identified patent and that said Letters Patent is hereby corrected as shown below:

<u>COLUMN 13</u>: continued

C: Foreign matter greatly generated. Color depth significantly reduced. --.

Signed and Sealed this

Thirtieth Day of November, 1999

Attest:

Q. TODD DICKINSON

Attesting Officer

*Acting Commissioner of Patents and Trademarks*